United States Patent [19]

Romero, Jr. et al.

[11] Patent Number: 4,648,032

[45] Date of Patent: Mar. 3, 1987

[54] DUAL PURPOSE SCREEN/MEMORY REFRESH COUNTER

[75] Inventors: Hector Romero, Jr., Austin; Joe C. St. Clair, Round Rock; James D. Wagoner, Georgetown, all of Tex.

[73] Assignee: International Business Machines Corporation, Armonk, N.Y.

[21] Appl. No.: 701,327

[22] Filed: Feb. 13, 1985

[51] Int. Cl.[4] .............................................. G06F 1/00
[52] U.S. Cl. .................................. 364/200; 340/747; 340/750; 365/222
[58] Field of Search ............... 340/747, 750; 365/222; 364/200 MS File, 900 MS File

[56] References Cited

U.S. PATENT DOCUMENTS 4,069,511  1/1978  Lelke ................................. 364/200

OTHER PUBLICATIONS

Application Note #4, Nibble Mode, published INMOS Corporation in Sep. 1982, entitled "Nibble Mode Operation Simplifies High—Bandwidth Memory Applications".

*Primary Examiner*—Raulfe B. Zache
*Attorney, Agent, or Firm*—J. F. Villella, Jr.

[57] ABSTRACT

A counter is used to concurrently refresh a video display and a memory associated with such video display. Address bits are output from the counter to the sync decode logic used to refresh the display as well as to multiplexing means connected to the associated memory. The multiplexing means has three pairs of inputs. The first pair of inputs comprises refresh addresses from the counter for refreshing the memory array. The second pair of inputs to the multiplexing means comprises memory update addresses for writing new information into the memory. A third pair of inputs to the multiplexing means performs two functions. The first function enables the multiplexing means to output either the update addresses or the refresh addresses depending on the state of such inputs. The second function of the third pair of inputs is to identify the output of said multiplexing means as either a row address or a column address to the associated memory. The apparatus and technique disclosed herein is especially pertinent when a "nibble mode" dynamic RAM is used as the memory.

10 Claims, 3 Drawing Figures

DUAL PURPOSE SCREEN/MEMORY REFRESH COUNTER

DESCRIPTION

1. Technical Field

The present invention relates to a counter in a video display adapter, and more particularly, to the use of such counter for refreshing both the display screen and the memory used to store information to be displayed on the display screen.

2. Background Art

Typical information processing systems include one or more video display terminals for providing a visual output of information. This visual output is in the form of an image. Such an image can be represented by any two dimensional array of image points represented by bit values stored at predetermined positions in a memory array made up of columns and rows of memory modules or chips. In order to process an imaging operation on the display terminal, it is required that an image or some part of an image be stored in a memory system which typically includes a memory array. Means must be provided for permitting access to sequences of image points along any row or column of the memory array. Such access to the memory array is required in order to write new information on the face of the display, as well as to refresh such information as is required by a cathode ray tube (CRT) display terminal.

In designing a display adapter which is used to drive the display of a video terminal, a counter is used to generate the vertical and horizontal syncs that are used to drive the display or monitor. These syncs are created by decoding the appropriate counts being generated by the counter. In high resolution display adapters, a memory, known as a bit map, is used to store the characters or information that are to be displayed. Typically the bit map resides in a random access memory (RAM). The addresses of dynamic RAMs must be periodically refreshed in order to maintain valid data. The bits are contained in a RAM in a row by column organization. To insure that all of the memory cells within a RAM remain sufficiently refreshed, all of the rows in the RAM must be refreshed on a periodic basis.

Due to timing constraints, the addresses needed to refresh the RAM must be implemented separately from the addresses normally used to read from and write to the RAM. Normally, the read and write addresses come from the main processor which manipulates the RAM. The refresh addresses are generated from a separate source.

U.S. Pat. No. 4,069,511 describes a digital bit image memory system formed with plural rows and columns of RAM devices which are arranged and continually addressed to simultaneously refresh the display and maintain the data stored in the RAM. The RAM is refreshed by attaching the display screen refresh counter to the RAM address lines so that the RAM refresh occurs concurrently with screen refresh. For an ordinary dynamic type RAM, as is disclosed in the '511 patent, this is accomplished by arranging the address lines on the RAM so that horizontally consecutive words and vertically consecutive scan lines on the screen are located in different rows of the RAM. In this manner, each row of the RAM is accessed as the CRT beam sweeps across and down the display screen.

Problems arise when trying to simultaneously refresh a screen and a RAM when the RAM is of the "nibble mode" type. A "nibble mode" RAM provides a significant improvement in memory bandwidth by taking advantage of the fact that in many applications, data is transferred to and from the RAM in blocks or packets. In using a "nibble mode" RAM, one cannot simply attach the RAM address lines to the display refresh counter as is done with an ordinary dynamic RAM. This is so because a "nibble mode" RAM takes consecutive bits from the same RAM row available at each access. In taking advantage of these extra bits from the same RAM row, only a portion of the number of rows are accessed per unit of time as are ordinarily accessed in a common dynamic RAM. Bits of the column address decode one of these consecutive row bits such that the access appears to be a single bit access.

A further complication arises when the display screen is interlaced. In an interlaced display, the image on the screen is composed of two fields. Each field comprises half the scan lines that make up the total image. In the display screen, the scan lines from the two fields alternate with each other. However, these two fields are sent to the display screen one after the other. The use of an interlaced display screen affects the way that the display refresh counter is coupled to the address lines of the "nibble mode" RAM. Heretofore, it is not been known to use a single counter to simultaneously refresh an interlaced display and a "nibble mode" dynamic RAM.

DISCLOSURE OF THE INVENTION

Accordingly, it is an object of this invention to provide an improved apparatus for concurrently refreshing a memory and a display screen associated with the memory.

It is another object of this invention to provide an apparatus for refreshing a "nibble mode" random access memory by using the output of a counter that is normally used to refresh a display screen.

In accordance with these and other objects, there is disclosed an apparatus and technique for refreshing a random access memory (RAM) simultaneously with the refreshing of the display screen associated with such RAM. The counter normally used in display adapters to generate the vertical and horizontal syncs used to drive the display screen is also used to refresh the RAM. The outputs from such counter are input to a plurality of multiplexors used to generate the refresh addresses for the RAM. Also input to the plurality of multiplexors are the system addresses used to read and write information into the RAM. The display screen used herein is of the interlaced type wherein the image on the display screen comprises two fields. Each field consists of half the scan lines that make up the image. On the display screen, scan lines from the two fields alternate with each other, however, the two fields are sent to the display screen one after the other.

The row addresses used to refresh the RAM are generated by an X refresh counter which counts bit strings for each horizontal line on the display screen; and, by a Y refresh counter which counts the number of completed horizontal lines on the display; and, by an interlacing flip/flop. This flip/flop determines if the odd numbered lines or the even numbered lines are being refreshed.

The preferred embodiment disclosed herein uses a "nibble mode" RAM for storing information. A "nibble mode" RAM differs from a conventional dynamic RAM by the yielding of four consecutive bits of data instead of one bit as is normal for a single generated address. As a result, the X counter in a "nibble mode" RAM counts at one-fourth the speed of the X counter with a conventional dynamic RAM. The X counter in the "nibble mode" RAM is also two bits smaller in size than the conventional X counter RAM. Since the X counter is both smaller and slower for the "nibble mode" RAM, more bits from the Y counter are used during memory refresh.

BEST MODE FOR CARRYING OUT THE INVENTION

Figure 1:
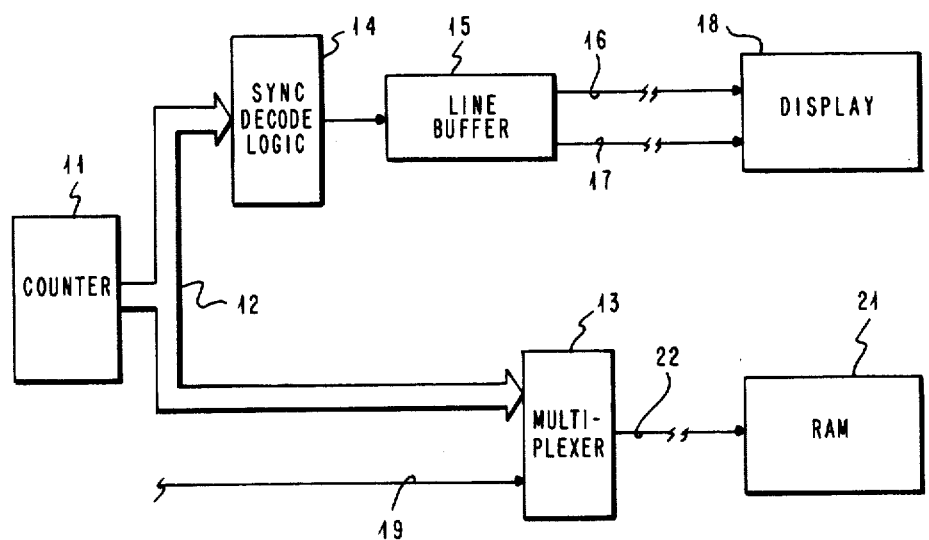
FIG. 1 is a overall block diagram of a display system including memory according to the present invention.

FIG. 1 illustrates in functional block form a video display system in which count bits are output from counter 11 over bus 12. These count bits function as screen/memory refresh addresses. The screen/memory refresh addresses are input to both multiplexor 13 and sync decode logic 14. Sync decode logic 14 in conjunction with line buffer 15 generates the vertical and horizontal syncs used to drive display 18. The horizontal and vertical syncs are output from line buffer 15 to display 18 over lines 16 and 17, respectively. The horizontal and vertical syncs are created by decoding within sync decode logic 14 the screen refresh addresses output from counter 11 over bus 12. The generation of vertical and horizontal syncs from a counter such as counter 11 is well known in the art and will not be discussed further hereinafter.

Also input to multiplexor 13 over line 19 are the memory update addresses for RAM 21. The memory update addresses input over line 19 are used to read and/or write data from and to RAM 21. These memory update addresses originate in the memory system's main processor (not shown). Due to timing constraints, the memory refresh addresses which are used to refresh RAM 21 must be implemented separately from the memory update addresses used to read/write to RAM 21. Multiplexor 13 multiplexes the memory refresh addresses from counter 11 with the read/write addresses input over line 19. The multiplexed one of these two addresses is then output over line 22 to RAM 21.

Figure 2:
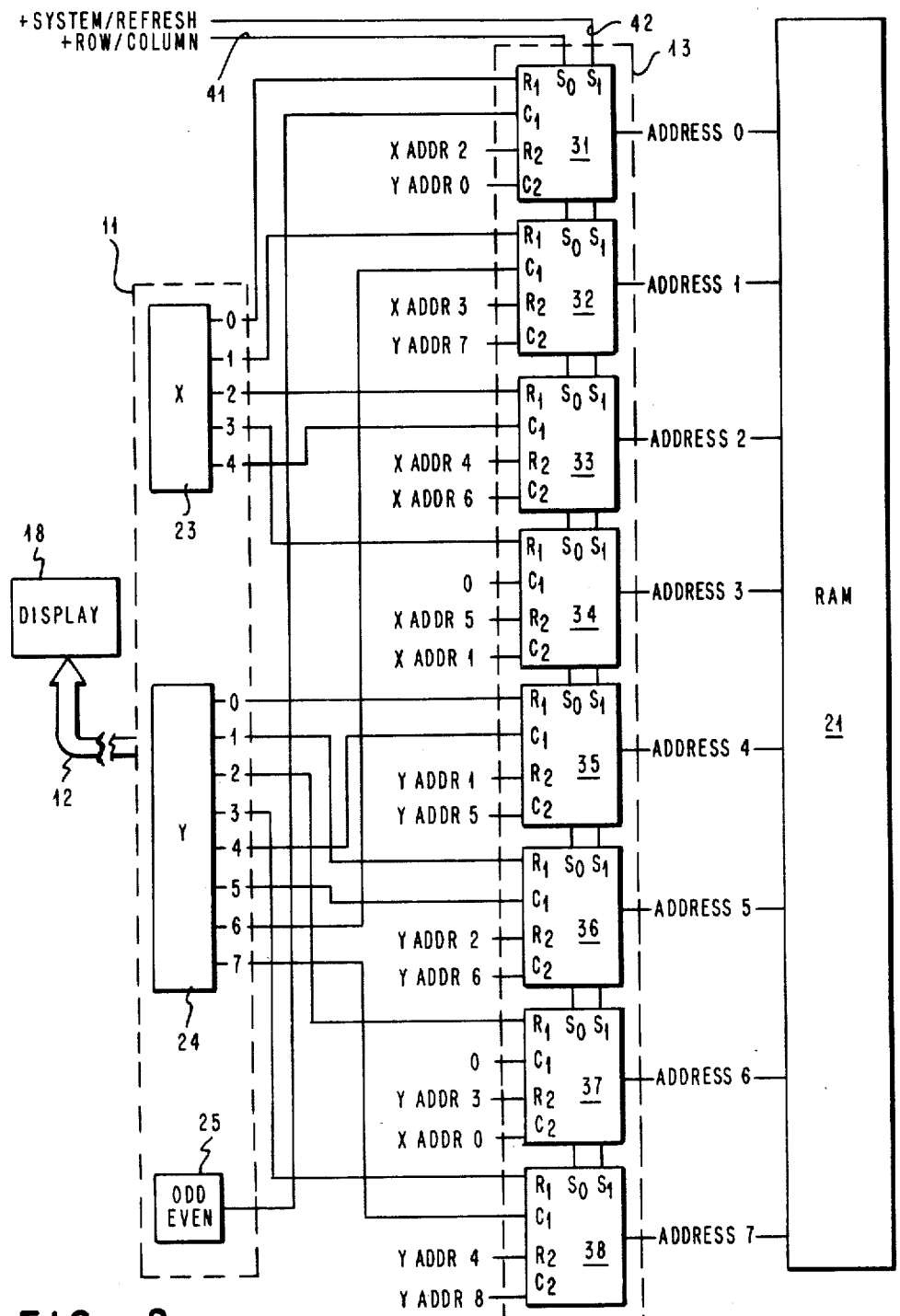
FIG. 2 is a logic diagram showing the multiplexing of addresses used to refresh and update the RAM array.

In the preferred embodiment described herein, RAM 21 is a 64K by 8 dynamic "nibble mode" random access memory. Like all dynamic RAMs, RAM 21 must have its addresses refreshed periodically in order to maintain valid data therein. The bits contained in RAM 21 are organized in 256 rows by 256 columns. To insure that all cells within RAM 21 remain sufficiently refreshed, all 256 rows must be refreshed every 4 milli-seconds. As can be seen in FIG. 2, counter 11 comprises horizontal or X counter 23, vertical or Y counter 24, and odd/even control 25. Also as seen in FIG. 2, multiplexor 13 comprises individual multiplexors 31-38. Each of multiplexors 31-38 has three pairs of inputs. A first pair of inputs to these multiplexors 31-38 are row/column line 41 and system/refresh line 42. Depending on the value of line 42, the addresses output from multiplexors 31-38 to RAM 21 function to either refresh the addresses in RAM 21 or to update the addresses in RAM 21. Similarly depending on the state of line 41, the addresses output from multiplexors 31-38 to RAM 21 act upon either the rows or the columns of RAM 21. The interaction between lines 41 and 42 with multiplexors 31-38 will be explained in more detail with respect to the timing diagram shown in FIG. 3.

The inputs to multiplexors 31-38 from X and Y counters 23 and 24, respectively, as well as odd/even control 25, function as the screen/memory refresh addresses. Note that these inputs in each of multiplexors 31-38 are labeled $R_1$ and $C_1$. The R and the C refer to rows and columns, respectively, within RAM 21. For example, output bit 0 from X counter 23 is the $R_1$ input to multiplexor 31, and bit 1 from X counter 23 is the $R_1$ input for multiplexor 32. Likewise, the bit output from odd/even control 25 functions as the $C_1$ input to multiplexor 31.

The third pair of inputs to multiplexors 31-38 provide the memory update addresses to RAM 21. For example, the memory update addresses input to multiplexor 31 are X address 2 which functions as the row input to multiplexor 31 and Y address 0 which functions as the column input to multiplexor 31. Likewise, Y address 4 and Y address 8 provide the memory update addresses for multiplexor 38.

X counter 23 provides bits 0-3 to multiplexors 31-34, respectively. Each of these bits, 0-3, functions as a screen/memory refresh address to RAM 21. As can be seen, multiplexors 31-38 provide addresses 0-7, respectively, to RAM 21. Bit 4, which is output from X counter 23 provides the column input to multiplexor 33 for the screen/memory refresh addresses. Bits 0-3 from Y counter 24, provide the row inputs to multiplexors 35-38, thereby providing the screen/memory refresh addresses for RAM 21. Bits 4-7 output from Y counter 24 provide the column inputs to multiplexors 35-38, thereby providing the screen/memory refresh addresses 4-7 for RAM 21.

As previously stated, the memory refresh addresses as well as the screen refresh addresses are generated by counter 11. X counter 23 generates the addresses required to refresh the entire length of each horizontal line in display 18. Y counter 24 generates the addresses required to refresh each and every horizontal line on display 18, while odd/even control 25 determines whether or not the odd numbered lines or the even numbered lines in display 18 are being refreshed at that time. In the preferred embodiment, odd/even control 25 is a flip flop which changes state as each complete field of lines on display 18 is refreshed. In the preferred embodiment disclosed herein, display 18 comprises 720 dots on each line with 512 lines. The time for refreshing each line is 40 microseconds. X counter 23 increments by one bit every 32 dot times, which is equivalent to 1.4 microseconds. Y counter 24 increments by one bit for each line, which is equivalent to 40 microseconds.

The primary use of counters 23 and 24 is to refresh display 18, but it is also desirable to arrange the outputs of counters 23 and 24 so as to access all 256 row addresses in RAM 21 in less than 4 milli-seconds. By so doing, all 256 row addresses are refreshed more rapidly than every 100 horizontal lines of display 18. The row address output from multiplexor 13 to RAM 21 comprises 8 bits, some of which must come from X counter 23 and some of which must come from Y counter 24, as previously described. The selected combination of counter bits is made up of 4 bits from X counter 23 and 4 bits from Y counter 24. The selected bits are X0, X1, X2, X3, Y0, Y1, Y2 and Y3. With this combination of bits, 16 of the 256 row addresses in RAM 21 are refreshed every line and all 256 addresses are refreshed every 16 lines. It takes approximately 640 microseconds for this refreshing to be completed, which is well below the 4 milli-seconds time limit that is desirable.

Figure 3:
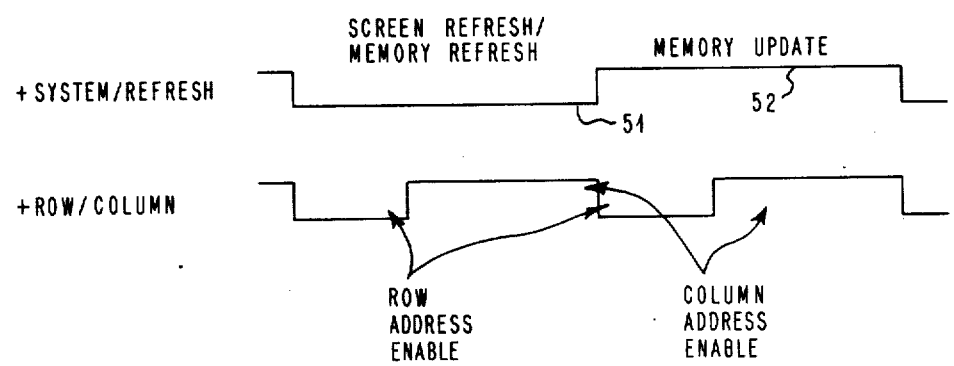
FIG. 3 is a timing diagram of the signals used to refresh and update the addresses within the RAM array.

FIG. 3 details the timing considerations for screen refresh/memory refresh and memory update, as well as the row/column enabling time periods. During time period 51, screen refresh/memory refresh is taking place. At this time, line 42 which forms the $S_1$ input to each of multiplexors 31-38 is in a first state and thus enables the refreshing of display 18 and RAM 21. The output addresses 0-7 from each of multiplexors 31-38 enables RAM 21 to be refreshed. For a part of time period 51, the row addresses of RAM 21 are being refreshed, while for the remainder of the time within time period 51, the column addresses of RAM 21 are being refreshed. Row/column line 41 which is the $S_0$ input to multiplexors 31-38 controls whether or not rows or columns are refreshed within RAM 21 within time period 51. During the first part of time period 51, line 41 is in a first state and multiplexors 31-38 are outputting the row addresses to RAM 21. During the later part of time period 51, multiplexors 31-38 are outputting the column addresses to RAM 21 because line 41 is in a second state.

During time period 52, RAM 21 is being provided with memory update addresses to change the content of the cells within RAM 21. Line 42, which is the $S_1$ input of multiplexors 31-38, is now in a second state. Consequently, multiplexors 31-38 are now outputting the memory update addresses to RAM 21 and not the memory refresh addresses. For example, at this time, either X address 2 ($R_2$ input) and Y address 0 ($C_2$ input) would be output from multiplexor 31 as the 0 address bit to RAM 21. Depending on the state of line 41, this 0 address bit would be either the row or the column address bit. During the first part of time period 52, the $S_0$ input of multiplexor 31 would cause the X address 2 or $R_2$ input of multiplexor 31 to be output therefrom as the 0 address bit to RAM 21. This 0 address bit would serve as the 0 row bit to RAM 21. Similarly, during the latter part of time period 52, line 41 would switch, thereby enabling the Y address 0 input of multiplexor 31 to be output as the 0 column address bit to RAM 21. Multiplexors 32-38 operate in the same manner as multiplexor 31 and will not be described in any further detail.

While this invention has been particularly shown and described with reference to a preferred embodiment thereof, it will be understood by those skilled in the art that the foregoing and other changes in form and detail may be made therein without departing from the spirit and scope of the invention.

We claim:

1. An image memory system, comprising:
   means for storing bits of information in a plurality of rows and columns, said means enabling accessing of a plurality of said bits in a single one of said plurality of rows during each refresh of said image memory system, thereby enabling accessing of a single row in said storing means during each refresh of said image memory system;
   means connected to said storing means for displaying an image representing the bits of information within said storing means; and,
   means connected to said storing means and said displaying means for concurrently refreshing said storing means and said displaying means.

2. An image memory system according to claim 1 wherein said storing means comprises a nibble mode random access memory.

3. An image memory system according to claim 1 wherein said displaying means comprises an interlaced screen having at least two fields for composing said image.

4. An image memory system according to claim 3 wherein each of said at least two fields comprises an equal proportion of lines composing said image, the lines in each of said at least two fields alternating with one another.

5. An image memory system according to claim 1 wherein said refreshing means comprises a counter for outputting refresh addresses to said storing means and to said displaying means.

6. An image memory system according to claim 5 further comprising means connected to said storing means for multiplexing said refresh addresses from said counter with memory update addresses from an external source, said multiplexing means outputting said refresh addresses and said update addresses to said storing means.

7. An image memory system according to claim 6 wherein said multiplexing means comprises a plurality of multiplexers connected to said counter, each of said plurality of multiplexors outputting an address bit to said storing means.

8. An image memory system according to claim 7 wherein each of said plurality of multiplexers comprises, a first pair of inputs connected to said counter for receiving said refresh addresses, and, a second pair of inputs for receiving said update addresses.

9. An image memory system according to claim 8 wherein each of said plurality of multiplexers further comprises a third pair of inputs for controlling the outputting of said address bit to said storing means, said third pair of inputs enabling the output of an address bit representing said refresh addresses when in a first state, and said third pair of inputs enabling the output of an address bit representing said update addresses when in a second state.

10. An image memory system according to claim 9 wherein said third pair of inputs further comprises means for identifying said address bit as a row address bit when said means is in a first state, said means identifying said address bit as a column address bit when said means is in a second state.

* * * * *